United States Patent
Kenny et al.

(10) Patent No.: US 6,685,334 B2
(45) Date of Patent: Feb. 3, 2004

(54) SYSTEM AND METHOD OF POWER MANAGEMENT FOR A SOLAR POWERED DEVICE

(75) Inventors: Thomas A. Kenny, Troy, MI (US); Raj Chawla, Bloomfield Hills, MI (US); Robert Gilling, Caro, MI (US); Thomas Marquardt, Troy, MI (US); Ernest Pacsai, Wixom, MI (US); Carl Szasz, Rochester Hills, MI (US)

(73) Assignee: G-5 Electronics, Troy, MI (US)

( * ) Notice: Subject to any disclaimer, the term of this patent is extended or adjusted under 35 U.S.C. 154(b) by 65 days.

(21) Appl. No.: 10/136,749

(22) Filed: Apr. 30, 2002

(65) Prior Publication Data

US 2003/0202344 A1 Oct. 30, 2003

(51) Int. Cl.$^7$ .................................... F21V 1/00
(52) U.S. Cl. ............... 362/183; 362/192; 362/276; 362/802; 362/31; 362/154; 362/259
(58) Field of Search ............... 362/183, 192, 362/276, 802, 31, 154, 259; 307/64, 66, 126; 320/101, 118, 39; 323/299, 906; 363/74, 43; 250/221; 136/292, 206; 315/149, 154, 157, 159

(56) References Cited

U.S. PATENT DOCUMENTS

| | | | |
|---|---|---|---|
| 3,617,850 A | 11/1971 | Domsby | 320/31 |
| 3,651,511 A | 3/1972 | Andrews et al. | 340/324 R |
| 3,852,652 A | 12/1974 | Jasinski | 320/35 |
| 4,006,396 A | 2/1977 | Bogut | 320/2 |
| 4,384,317 A | 5/1983 | Stackpole | 362/183 |
| 4,476,520 A | * 10/1984 | Gallemore | 363/43 |
| 4,481,562 A | 11/1984 | Hickson | 362/183 |
| 4,484,104 A | 11/1984 | O'Brien | 315/86 |
| 4,514,727 A | 4/1985 | Van Antwerp | 340/793 |
| 4,588,938 A | 5/1986 | Liautaud et al. | 320/2 |
| 4,593,155 A | 6/1986 | Hawkins | 179/2 EA |
| 4,636,741 A | 1/1987 | Mitzlaff | 330/127 |
| 4,649,334 A | 3/1987 | Nakajima | 323/299 |
| 4,668,120 A | 5/1987 | Roberts | 404/12 |
| 4,673,861 A | 6/1987 | Dubovsky et al. | 320/2 |
| 4,680,527 A | 7/1987 | Benenati et al. | 320/2 |
| 4,682,147 A | 7/1987 | Bowman | 340/286 R |
| 4,684,870 A | 8/1987 | George et al. | 320/20 |
| 4,691,118 A | 9/1987 | Nishimura | 307/66 |
| 4,698,579 A | 10/1987 | Richter et al. | 320/14 |
| 4,700,122 A | 10/1987 | Cimino et al. | 320/61 |
| 4,700,375 A | 10/1987 | Reed | 379/61 |
| 4,709,202 A | 11/1987 | Koenck et al. | 320/43 |
| 4,710,693 A | 12/1987 | Wigell | 320/2 |
| 4,710,694 A | 12/1987 | Sutphin et al. | 320/21 |

(List continued on next page.)

OTHER PUBLICATIONS

US 6,175,216, 1/2001, Andersen et al. (withdrawn)

*Primary Examiner*—Sandra O'Shea
*Assistant Examiner*—Mark Tsidulko
(74) *Attorney, Agent, or Firm*—Gifford, Krass, Groh, Sprinkle, Anderson & Citkowski, P.C.

(57) ABSTRACT

A solar powered light assembly having an integral power management system includes a means for collecting solar energy, and a plurality of energy storage devices. The device also includes a control means for selecting to charge one energy storage device and selecting to discharge one energy storage device to a predetermined level before selecting to recharge the selected discharging energy storage device. The device also includes a sensing means for sensing a predetermined charging condition and an energy charge switching means for selectively charging one of the energy storage devices. The device further includes a discharge sensing means and an energy discharge switching means for selectively discharging energy from the selected discharging energy storage device and a load switching means for delivering energy from the selected discharging energy storage device to the load for powering the solar powered device.

64 Claims, 3 Drawing Sheets

U.S. PATENT DOCUMENTS

| | | | |
|---|---|---|---|
| 4,724,528 A | 2/1988 | Eaton | 364/715 |
| 4,728,958 A | 3/1988 | Choate | 342/424 |
| 4,736,186 A | 4/1988 | Jones | 340/331 |
| 4,737,702 A | 4/1988 | Koenck | 320/40 |
| 4,740,754 A | 4/1988 | Finger | 324/428 |
| 4,742,290 A | 5/1988 | Sutphin et al. | 320/21 |
| 4,746,854 A | 5/1988 | Baker et al. | 320/40 |
| 4,751,622 A | 6/1988 | Williams | 362/183 |
| 4,766,361 A | 8/1988 | Pusateri | 320/2 |
| 4,767,977 A | 8/1988 | Fasen et al. | 320/20 |
| 4,833,459 A | 5/1989 | Geuer et al. | 340/636 |
| 4,841,278 A | 6/1989 | Tezuka et al. | 340/908.1 |
| 4,849,330 A * | 7/1989 | Humphries et al. | 205/777.5 |
| 4,884,017 A | 11/1989 | Williams | 320/2 |
| 4,963,811 A | 10/1990 | Weber | 320/1 |
| 4,988,889 A | 1/1991 | Oughton, Jr. | 307/66 |
| 5,003,456 A | 3/1991 | Forge | 363/89 |
| 5,012,160 A | 4/1991 | Dunn Thompson | 315/149 |
| 5,027,258 A | 6/1991 | Schöniger et al. | 362/31 |
| 5,138,534 A | 8/1992 | Wu | 362/72 |
| 5,150,031 A | 9/1992 | James et al. | 320/2 |
| 5,152,601 A | 10/1992 | Ferng | 362/183 |
| 5,175,528 A | 12/1992 | Choi et al. | 340/331 |
| 5,195,813 A | 3/1993 | Brown | 362/61 |
| 5,203,003 A | 4/1993 | Donner | 395/800 |
| 5,211,470 A | 5/1993 | Frost et al. | 362/183 |
| 5,214,352 A | 5/1993 | Love | 315/86 |
| 5,221,891 A | 6/1993 | Janda et al. | 323/350 |
| 5,225,003 A * | 7/1993 | Ming-Che | 136/206 |
| 5,237,490 A | 8/1993 | Ferng | 362/183 |
| 5,241,680 A | 8/1993 | Cole et al. | 395/750 |
| 5,252,893 A | 10/1993 | Chacham et al. | 315/200 A |
| 5,257,423 A | 11/1993 | Jacobsen et al. | 4/630 |
| 5,262,756 A | 11/1993 | Chien | 340/332 |
| 5,276,539 A * | 1/1994 | Humphrey | 349/14 |
| 5,285,208 A | 2/1994 | Bertiger et al. | 342/352 |
| 5,309,656 A | 5/1994 | Montgomery | 40/442 |
| 5,313,187 A | 5/1994 | Choi et al. | 340/331 |
| 5,313,188 A | 5/1994 | Choi et al. | 340/331 |
| 5,365,145 A | 11/1994 | Fields | 315/86 |
| 5,367,442 A | 11/1994 | Frost et al. | 362/183 |
| 5,404,544 A | 4/1995 | Crayford | 395/750 |
| 5,453,729 A | 9/1995 | Chu | 340/332 |
| 5,457,450 A | 10/1995 | Deese et al. | 340/912 |
| 5,519,261 A | 5/1996 | Stewart | 307/87 |
| 5,546,568 A | 8/1996 | Bland et al. | 395/550 |
| 5,553,276 A | 9/1996 | Dean | 395/550 |
| 5,625,807 A | 4/1997 | Lee et al. | 395/560 |
| 5,650,669 A | 7/1997 | Aldous | 307/66 |
| 5,659,465 A | 8/1997 | Flack et al. | 363/71 |
| 5,692,197 A | 11/1997 | Narad et al. | 395/750 |
| 5,701,597 A | 12/1997 | Nakanishi et al. | 455/127 |
| 5,717,203 A * | 2/1998 | Yung | 250/221 |
| 5,748,911 A | 5/1998 | Maguire et al. | 395/281 |
| 5,754,798 A | 5/1998 | Uehara et al. | 395/284 |
| 5,761,517 A | 6/1998 | Durham et al. | 395/750.04 |
| 5,774,704 A | 6/1998 | Williams | 395/556 |
| 5,782,552 A | 7/1998 | Green et al. | 362/183 |
| D397,233 S | 8/1998 | Bassford | D26/67 |
| D397,470 S | 8/1998 | Bassford et al. | D26/67 |
| 5,796,992 A | 8/1998 | Rief et al. | 395/555 |
| 5,826,092 A | 10/1998 | Flannery | 395/750.06 |
| 5,878,251 A | 3/1999 | Hagiwara et al. | 395/560 |
| 5,894,577 A | 4/1999 | MacDonald et al. | 395/733 |
| 5,900,757 A | 5/1999 | Aggarwal et al. | 327/198 |
| 5,905,356 A | 5/1999 | Wells | 320/2 |
| 5,907,685 A | 5/1999 | Douceur | 395/200.78 |
| 5,923,100 A * | 7/1999 | Lukens et al. | 307/66 |
| 5,996,084 A | 11/1999 | Watts | 713/323 |
| 6,013,985 A | 1/2000 | Green et al. | 315/149 |
| 6,028,597 A | 2/2000 | Ryan, Jr. et al. | 345/211 |
| 6,065,122 A | 5/2000 | Wunderlich et al. | 713/320 |
| 6,115,971 A | 9/2000 | Loebertmann et al. | 52/79.1 |
| 6,118,248 A | 9/2000 | Gartstein et al. | 320/107 |
| 6,133,642 A | 10/2000 | Hutchinson | 290/1 A |
| 6,157,161 A | 12/2000 | Canter et al. | 320/101 |
| 6,184,656 B1 | 2/2001 | Karunasiri et al. | 320/119 |
| 6,209,752 B1 | 4/2001 | Mitchell et al. | 222/63 |
| 6,290,367 B1 | 9/2001 | Greenhoe et al. | 362/183 |
| 6,377,024 B1 * | 4/2002 | Choy | 320/118 |
| 6,402,338 B1 * | 6/2002 | Mitzel et al. | 362/154 |
| 6,462,507 B2 * | 10/2002 | Fisher, Jr. | 320/101 |
| 2001/0002772 A1 | 6/2001 | Kim et al. | 307/48 |
| 2001/0005122 A1 | 6/2001 | Higuchi | 320/106 |
| 2001/0011883 A1 | 8/2001 | Sonobe | 320/134 |
| 2001/0015635 A1 | 8/2001 | Leppo et al. | 320/116 |
| 2001/0026143 A1 | 10/2001 | Kaji et al. | 320/106 |
| 2001/0030528 A1 | 10/2001 | Ootani | 323/272 |
| 2002/0020119 A1 * | 2/2002 | Oberhofer et al. | 52/27 |
| 2002/0030994 A1 * | 3/2002 | Krietzman et al. | 362/259 |
| 2002/0105794 A1 * | 8/2002 | Hanscom et al. | 362/31 |

* cited by examiner

SYSTEM AND METHOD OF POWER MANAGEMENT FOR A SOLAR POWERED DEVICE

BACKGROUND OF THE INVENTION

1. Field of the Invention

The present invention relates generally to a solar powered device and, more specifically, to a system and a method of power management for a solar powered device having an integral power management system.

2. Description of the Related Art

The use of solar energy as a source of energy for various types of devices is well known in the art. The solar energy is collected during the daytime via a solar panel electrically connected to the energy storage device. The energy stored in the energy storage device is discharged to power the device. For example, a solar powered light utilizes solar energy as a power source to illuminate the light, and the available energy is stored in an energy storage device, such as a rechargeable battery, or a storage capacitor.

Solar power is advantageously utilized in situations where other sources of power are not readily available. With respect to solar powered lights, examples includes outdoor landscape lights, or lights in buildings without electrical power, i.e. shed or portable restroom. While these and other types of solar powered devices work well under a variety of operating conditions, they periodically require service to replace the energy storage device, i.e. battery. A characteristic of an energy storage device, such as a battery, is a finite number of charge cycles. Therefore, the energy storage device has to be periodically replaced, and a long life cycle is more cost effective. At the same time, it may be difficult to service the solar powered device due to the physical location of the device. Thus, there is a need in the art for a solar powered device with an integral power management system that efficiently distributes energy to prolong the life of the energy storage device.

SUMMARY OF THE INVENTION

Accordingly, the present invention is a solar powered device and a method of power management for the solar powered device. The solar powered device includes a means for collecting solar energy, and a means for storing the collected solar energy having a plurality of energy storage devices, operatively connected to the solar energy collecting means via an energy transfer bus. The device also includes a control means for selecting to charge at least one energy storage device and selecting to discharge at least one energy storage device, such that the selected at least one discharging energy storage device is discharged to a predetermined level before selecting to recharge the selected at least one discharging energy storage device. The device still also includes a sensing means for sensing a predetermined condition for charging at least one energy storage device that is in electrical communication with the control means and an energy charge switching means responsive to a signal from the control means for selectively charging at least one of the energy storage devices to the predetermined charge level by transferring energy from the solar energy collecting means to the selected at least one charging energy storage device upon the occurrence of the predetermined charging condition. The device further includes a sensing means in electrical communication with the control means for sensing a predetermined condition for discharging the selected at least one energy storage device, and an energy discharge switching means responsive to a signal from the control means for selectively discharging energy from the selected at least one discharging energy storage device to the predetermined discharge level upon the occurrence of the predetermined charging condition. The device still further includes a load switching means responsive to a signal from the control means for delivering energy from the selected at least one discharging energy storage device to the load for operatively powering the solar powered device.

The method of power management for the solar powered device includes the steps of determining if a predetermined condition is met for supplying energy to the load, selectively discharging energy from at least one discharging energy storage device to the load, if the selected at least one energy storage device contains a predetermined level of stored energy for supplying energy to the solar powered device and checking the predetermined level of stored energy of another selected energy storage device, if the selected at least one energy storage device does not contain a predetermined level of stored energy, until selecting at least one energy storage device having a predetermined level of stored energy. The method also includes the steps of determining if a predetermined condition is met for selectively charging at least one energy storage device by transferring energy collected by the solar collector to the selected at least one energy storage device if the predetermined charging condition is met. The method further includes the steps of discharging the selected at least one discharging energy storage device to a predetermined discharge level before selecting to charge the selected at least one discharging energy storage device to a predetermined charge level.

One advantage of the present invention is that a solar powered device, which in this example is a light, is provided with an integral power management system for efficiently managing energy storage and consumption. Another advantage of the present invention is that a solar powered device is provided with an integral power management system that controls the charging and discharging of the energy storage devices according to their charge level, to extend the life of the energy storage devices. Still another advantage of the present invention is that a solar powered device is provided with reduced service needs. A further advantage of the present invention is that a solar powered device is provided that utilizes a storage capacitor to store solar energy. Still a further advantage of the present invention is that a method of power management for a solar powered device is provided that improves the life of the energy storage device by ensuring that the available energy stored in at least one of the energy storage devices is depleted to a predetermined level before recharging that particular device.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
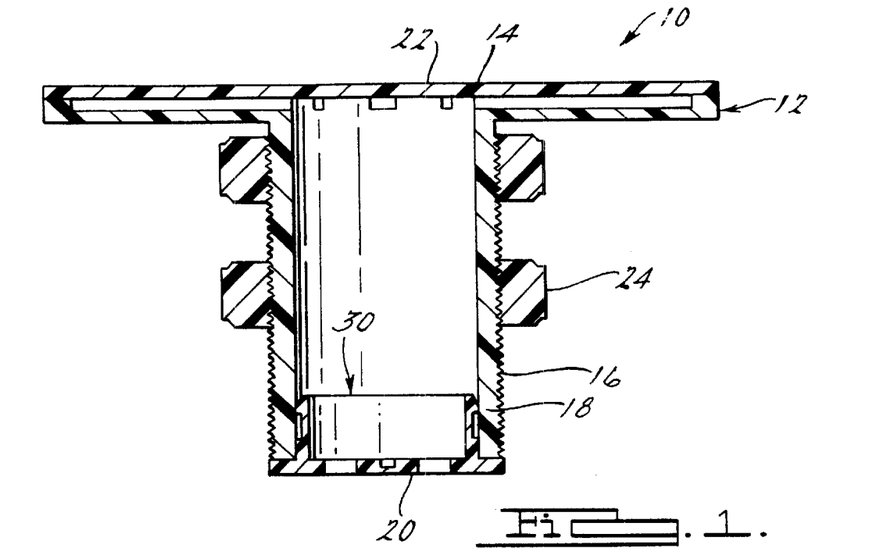
FIG. 1 is a cross-sectional view of a solar powered light assembly, according to the present invention.
Figure 2:
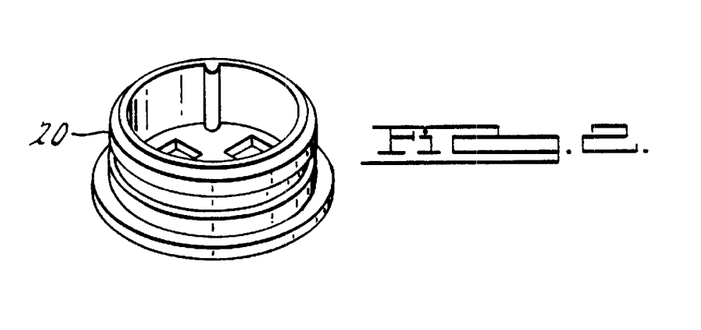
FIG. 2 is an elevational view of the end cap for the solar powered light assembly of FIG. 1, according to the present invention.
Figure 3:
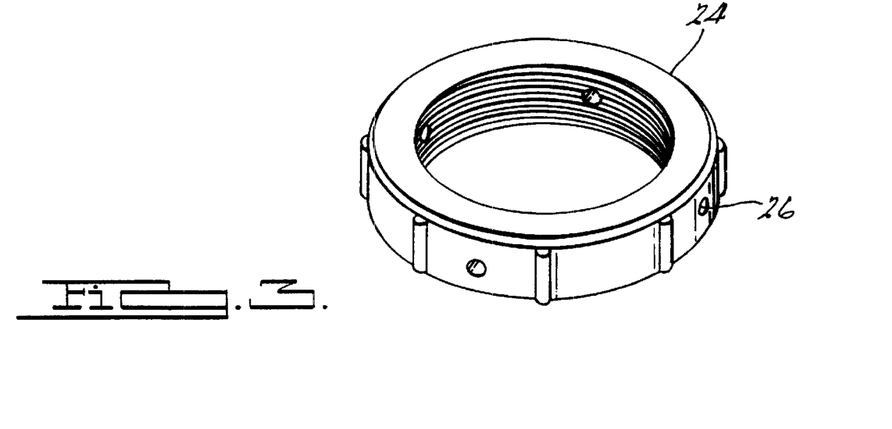
FIG. 3 is an elevational view of the retaining member for the solar powered light assembly of FIG. 1, according to the present invention.

Referring to FIGS. 1 through 3, a solar powered device with an integral power management system is illustrated. It should be appreciated that in this example, the solar powered device is a solar powered light, although other types of solar powered devices are contemplated. Solar powered lights are frequently utilized in applications where solar power is readily available as a power source. In this example, the solar powered light assembly 10 is disposed in the ceiling of a structure, such as a portable restroom (not shown), and provides a light source for the portable restroom. It is contemplated that the solar powered light assembly 10 with integral power management system can be utilized in a number of different solar powered light applications.

The solar powered light assembly 10 includes a housing 12. In this example, the housing 12 is mounted in an aperture in the ceiling of the portable restroom. The housing 12 contains a power management system that operatively provides energy to a light source in a manner to be described. In this example, the housing 12 includes a generally planar support member 14.

The housing 12 also includes a projecting member 16 extending radially from a lower portion of the support member 14. Preferably, the projecting member extends into the restroom in an installed position. In this example, the projecting member 16 has a tubular shape, and is fabricated from an opaque material, such as plastic, although a light transmitting material is also contemplated. Also, in this example, an outer surface of the projecting member is threaded, as shown at 18, for positioning and retaining the solar powered light assembly 10 within the ceiling of the restroom.

The solar powered light assembly 10 also includes an end cap 20 disposed in a distal end of the illuminating member 16. Preferably, the end cap 20 is removable, to allow access to the power distribution system 30. In this example, the end cap 20 is retained in the distal end of the illuminating member 16 using a retaining means such as an interference fit between the end cap 20 and the wall of the projecting member 16, a fastener such as a screw, or other such retaining mechanism. The end cap 20 includes a predetermined number of apertures arranged in a predetermined pattern for transmitting light from a light source, such as a light emitting diode (LED) disposed within the aperture. The light emitting diode is operatively connected to the integral power management system in a manner to be described, and when illuminated, provides a source of light.

The solar powered light assembly 10 also includes a retaining member 24 for securing the housing to the structure, which in this example is a ceiling. Preferably, two retaining members 24 engage the threaded surface 18 of the projecting member 16 to fixedly position the light assembly 10. The retaining member 24 is ring-shaped, and an inner surface of the retaining member is threaded, to engage with the corresponding threaded surface 18 of the projecting member 16. The retaining member 24 may include an aperture 26 extending therethrough a wall of the retaining member 24, for receiving a locking means (not shown). In this example, the retaining member 24 is a jam nut and the locking means is a set screw disposed in the aperture 26, for locating the solar powered light assembly 10 at a predetermined positioned in the aperture in the ceiling. It should be appreciated that other types of fasteners are contemplated. The jam nut is disposed on the threads 18 of the projecting member 16 and locked in place using the set screw. Advantageously, the solar powered light assembly 10 can be installed in ceilings of varying thickness, or positioned to extend different heights from the ceiling.

The solar powered light assembly 10 also includes a solar energy collector 22, as is known in the art. The solar energy collector 22 is positioned on a surface of the support member 14, such that it is accessible to solar power. Advantageously, the solar energy collector 22 is positioned on an outer surface of the support member 14 facing towards a solar energy source, when installed in the portable restroom. The solar energy collector 22 is in electrical communication with the power management system 30. It should be appreciated that the solar energy collector 22 may be used as a light sensor for turning the solar powered light 10 on or off. For example, when the sun is out, the solar panel voltage rises. If the voltage exceeds a predetermined voltage threshold indicating that it is daytime, then the light is turned off. Similarly, if the voltage decreases and is less than a predetermined voltage, it is night and the light is illuminated.

Figure 4:
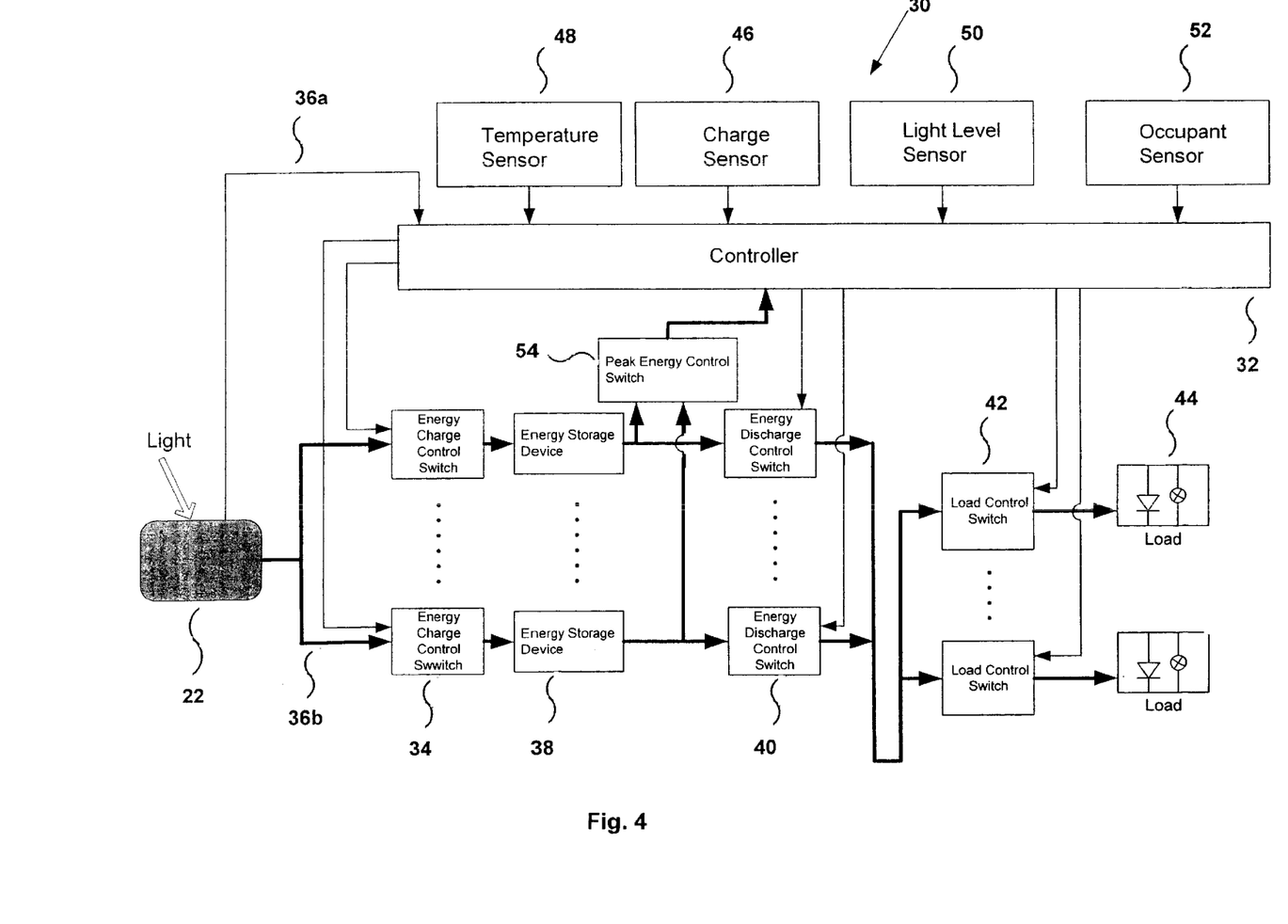
FIG. 4 is a block diagram of a power management system for a solar powered device, such as the solar powered light assembly of FIG. 1, according to the present invention.

Referring to FIG. 4, a power management system 30 for a solar powered device, such as the solar powered light assembly 10 of this example, is illustrated. The power management system 30 is fixedly supported within the housing 12. The solar energy collector 22, also referred to as a solar energy panel, is electrically connected to a control means 32 via a communications bus 36a, as is known in the art. The control means 32 includes a processor that receives inputs from various sources, processes these inputs in a predetermined manner, and provides an output signal to control the energy storage devices 38 and a light source 44, in a manner to be described. In this example, the control means 32 is a microprocessor, although other types of processors are contemplated.

Solar energy collected by the solar energy collector is transferred via an energy transfer bus 36b to an energy storage means. In this example, the energy storage means includes a plurality of energy storage devices 38. Various types of energy storage devices 38 are known in the art, such as NiMW batteries, NiCAD batteries or other rechargeable batteries or capacitors or the like. Preferably, the energy transfer bus 36b interconnects the solar energy collector panel 22, energy storage devices 38 and the light source 44. The energy flow within the energy transfer bus 36b is controlled by the energy charge control switch 34, energy control discharge switch 40 and load control switch 42 in response to a signal from the control means 32, in a manner to be described.

The energy control charge switch 34, as is understood in the art, is disposed in the energy transfer bus 36b and electrically in communication with the control means 32 via the communications bus 36a. Various types of switches are known in the art, such as mechanical relays, solid relays, or semiconductor relays or the like. It should be appreciated that each one of the plurality of energy storage devices 38 is associated with a corresponding energy charge control switch 34. The energy charge control switch 34 controls the selection of the energy storage device 38 for charging purposes in response to a signal from the control means 32, in a manner to be described.

One example of an energy storage device 38 is a rechargeable battery, as is known in the art. Preferably, the battery is a battery bank containing at least one battery, as is known in the art. An energy charge control switch 34 is associated with each corresponding battery bank. Preferably, the battery bank with the peak charge level is used for providing power to the light source until discharged, while the other battery banks serve as alternate cells. It is contemplated that every time a battery bank is fully charged, it will not be charged again until discharged to a predetermined level, such as fully discharged or partially discharged. It should be appreciated that any of the other battery banks are available to power the system at any given time. Advantageously, by managing how and when the battery is charged and discharged, the time between charges, and the useful life of the energy storage device is increased. For example, a single fully charged battery bank can potentially supply enough energy to power the light source for about two consecutive nights, thus effectively doubling the life of each battery.

The power management system also includes an energy discharge control switch 40 in line with the energy transfer bus 36*a*, and operatively connected to the control means 32 via the communications bus 36*a*. The energy discharge control switch controls the discharge of energy from the energy storage device 38 to the light source 44 via the energy transfer bus 38*b*. It should be appreciated that each energy storage device 38 has a corresponding energy discharge control switch 40.

The power management system 30 further includes a peak voltage switch 54, such as a diode, disposed in the energy transfer bus 36*b*, between the energy storage device 38 and the control means 32. The peak voltage switch 54 operatively regulates the supply of energy to operate the control means 32. Preferably, the peak voltage switch 54 operatively allows the energy storage device 38 having the peak voltage to supply energy to the control means 32. It should be appreciated that if after a period of time the voltage of the selected energy storage device with peak voltage drops below the voltage of another one of the energy storage devices 38, the energy storage device 38 with the higher peak voltage supplies energy to the control means 32. Advantageously, continuous energy supply to the control means 32 is ensured. At the same time, the selected energy storage device for discharging energy to the load continues to supply energy to the load, regardless of whether it is also supplying energy to control means 32.

The power management system 30 also includes a load control switch 42 operatively disposed in the energy transfer line between the energy storage device and the load, such as the light source 44 of this example. The load control switch is responsive to a signal from the control means 32 via the communications bus 36*a*. In this example, there are a plurality light sources 44, with each having a corresponding load control switch 42. Preferably, the light source 44 is a light emitting diode (LED). Advantageously, the control means 32 sends a signal to the load control switch 42 to selectively turn on or off the corresponding LED. For example, the LEDs can be individually controlled thus allowing the LEDs to be lit in any combination, such as one blinking, two blinking, or an alternating pattern of blinking.

In a conventional solar powered light, more light is emitted at the beginning of the discharge cycle than at the end of the discharge cycle, since light intensity is directly related to voltage. It is also contemplated that a technique known as pulse width modulation can be used to maintain a constant LED light amplitude by sequentially turning each one of the lights on for a predetermined period of time, and then turning it off for a predetermined period of time. This technique effectively increases the efficiency with which power is managed.

For example, the duty cycle of the LED driver signal is varied by a predetermined mathematical relationship between the currently active battery voltage and the duty cycle required to maintain a constant light output. By controlling the time on and time off, referred to as the duty cycle, along with increasing or decreasing the modulating frequency, a constant light amplitude is provided. Advantageously, the use of this technique more efficiently utilizes energy from the energy storage device 38, thus effectively increasing the storage life of the energy storage device 38.

It should be appreciated that the power management system 30 also includes other sensors for power management operatively connected to the microprocessor. For example, a charge sensor 46 senses the state of charge of each energy storage device 38 and provides an electrical signal to the control means 32 indicating the state of charge. In this example, the charge sensor 46 senses the output voltage level of the energy storage device 38, such as a decrease in battery voltage when the energy storage device 38 is fully charged.

Another example of a sensor electrically connected to the control means 32 is a temperature sensor 48. The temperature sensor 48 provides an electrical signal to the control means 32 indicating the temperature within or in the vicinity of the energy storage device 38. Preferably, the temperature sensor 48 is a thermistor. For example, if the energy storage device 38 is fully charged, the temperature increases if charging continues. The control means 32 detects the temperature increase and stops charging of that energy storage device 38 if a predetermined temperature is attained, to protect the device. Furthermore, if the ambient temperature is higher than a recommended maximum operating temperature, charging is delayed until the temperature decreases. It is understood in the art that charging a battery at too low of an ambient temperature can decrease the operating life of the battery. If the ambient temperature is below a predetermined operating temperature, the battery is recharged using the previously described pulse width modulation technique to charge the battery for predetermined intervals to gradually increase the temperature of the battery until a predetermined constant charge temperature is attained for constant charging.

Still another example of a sensor is a light level sensor 50 that senses the amplitude of light produced by the light source 44 and transmits a corresponding signal to the control means 32. For example, if the control means 32 determines that the light amplitude is too low, it can selectively discharge energy from another one of the energy storage devices 38 to provide power to the light source 44. Alternatively, the control means 32 can change the duty cycle of the LED drive currents to change the amplitude of the light output.

A further example of a sensor is a passive infrared sensor 52 that senses the presence of heat, such as from a person, and turns on the light source 44. In this example, the restroom light is only turned on while the restroom is occupied, in order to conserve energy.

It should be appreciated that the solar powered light assembly 10 may include other components, such as sensors 58 or switches 60, or the like that are known in the art for operating a solar powered light assembly 10.

In an alternative embodiment, the energy storage device 38 is a storage capacitor for storing energy. The storage capacitor has the advantage of a longer life cycle as compared to a battery. In addition, the storage capacitor does not display the same charge cycle and temperature limitations as a rechargeable battery.

Figure 5:
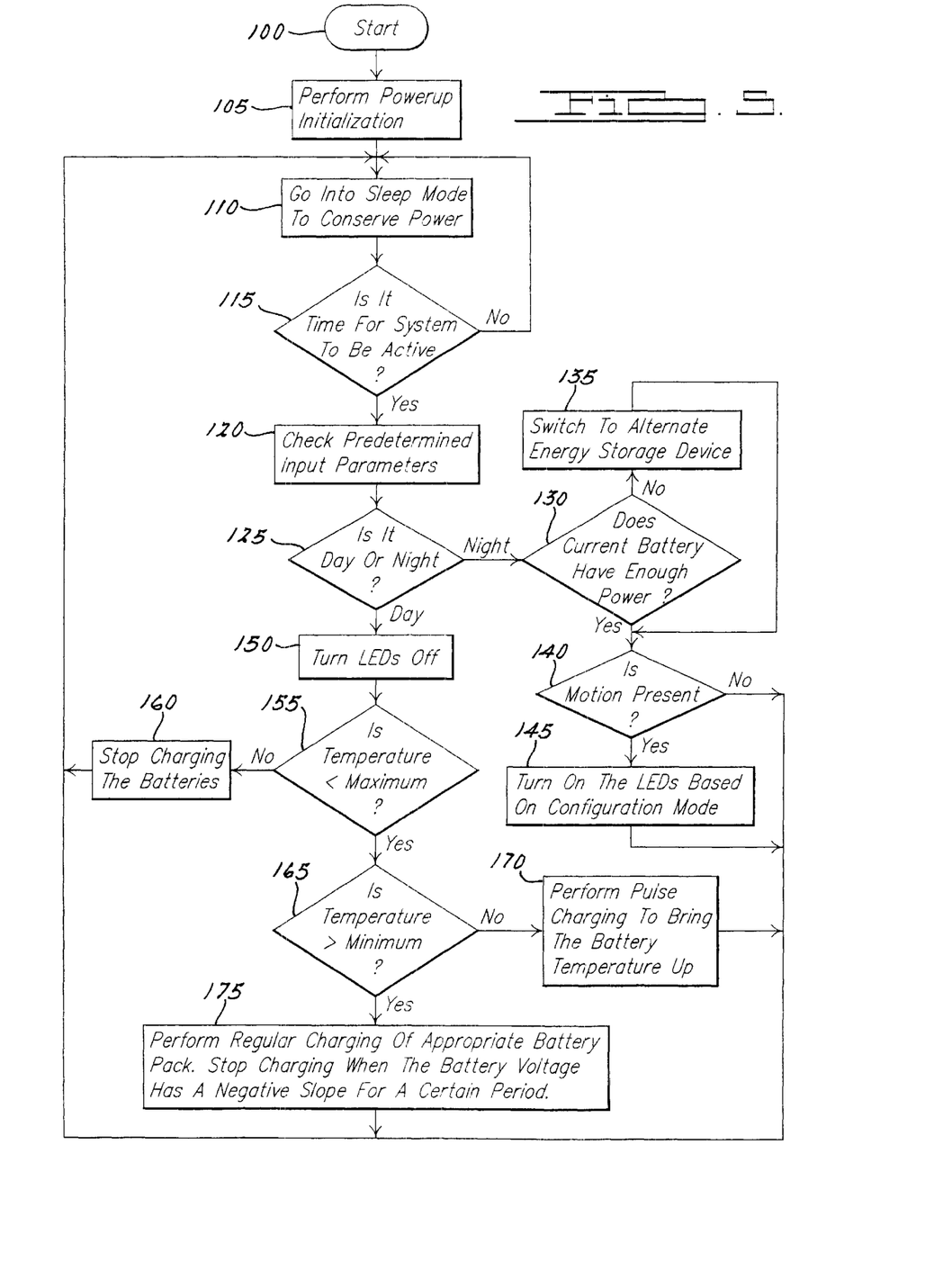
FIG. 5 is a block diagram of method of power management for a solar powered device, such as the solar powered light assembly of FIG. 1, according to the present invention.

Referring to FIG. 5, a flowchart of a method of power management for a solar powered device with an integral power management system 30, such as the solar powered light assembly 10 of this example, is illustrated. The methodology begins in block 100 and advances to block 105. In block 105, the methodology initializes the power distribution system 30. For example, the solar powered light assembly 10 is powered on. Also, initial conditions are established by the various sensors providing input signals to the control means 32. The methodology advances to block 110, and the power distribution system 30 enters a sleep mode. Advantageously, the sleep mode conserves power by reducing the functionality of the solar powered light assembly 10 until the energy storage device is 38 is charging or discharging in response to a signal from the control means. The methodology advances to diamond 115.

In diamond 115, the methodology determines if a predetermined condition is met for the power distribution system 30 to be in an active mode, i.e. wake up from the sleep mode. For example, the control means 32 may receive a signal that it is time to charge the energy storage device 38 since the sun is out. Or, the control means 32 may receive a signal that energy should be transferred to the load from the energy storage device 38. If it is not time for the power distribution system 30 to enter an active mode, the methodology returns to block 110. If it is time for the power distribution system 30 to begin an active mode, the methodology advances to block 120.

In block 120, the methodology checks predetermined input parameters. For example, the signal from a sensor, such as the charge sensor 46, or light level sensor or temperature sensor 48 is transmitted as an input to the control means 32. The control means 32 utilizes the signal as described herein. The methodology advances to diamond 125.

In diamond 125, the methodology utilizes the input signal to determine if solar power is available, i.e. is it daytime or nighttime. For example, a voltage signal from the solar panel 22 is used to determine if it is daytime or nighttime. If the time of day is night, the methodology advances to diamond 130 and continues.

In diamond 130, the methodology selects one of the energy storage devices 38 and determines if the selected energy storage device meets a predetermined condition for discharging, such as if a peak charge level is satisfied. For example, the control means 32 evaluates the charge voltage of the selected energy storage device using a signal from the charge sensor to determine if the selected energy storage device 38 has the highest peak voltage. It is assumed that the energy storage device with the peak voltage has sufficient stored energy to provide power to the load, which in this example is the light source 44. Advantageously, the energy transfer bus 36b is disconnected from the energy storage device 38 when the state of charge of the energy storage device 38 is determined, to isolate external factors from influencing the state of charge determination.

If the selected energy storage device 38 does not meet the predetermined discharge condition, i.e. have sufficient stored energy, the methodology advances to block 135 and the methodology selects another energy storage device 38 for the purpose of discharging energy. The methodology returns to diamond 130 and continues by checking the energy storage level of the selected energy storage device 38. Returning to diamond 130, if the selected energy storage device 38 does meet the predetermined discharge condition, i.e. it has sufficient stored energy, the methodology advances to diamond 140.

It is contemplated that with two or more banks of rechargeable batteries, each bank is used until discharged to a predetermined discharge level and is then charged to a predetermined charge level. One bank is used for providing power to the light source 44, and the other battery banks are alternate cells, if necessary. Preferably, each battery bank is selected in a sequential manner, if the battery bank meets the predetermined condition for discharging. Since each battery bank has a finite life, by using the battery bank with the peak voltage until discharged, and then charging the discharged battery bank, the effective life of each of the battery banks is significantly increased. If the control means 32 determines that the currently selected battery bank is discharged while the load still requires power, the system switches to another battery bank to provide power. It should be appreciated that the system may set a flag indicating the discharged battery bank requires charging the next charging cycle.

In diamond 140, the methodology determines if a predetermined condition is met to discharge the battery and supply energy to the load. For example, a sensor such as an infrared motion sensor 52 is utilized to determine the presence of an occupant and turn on the light. If the predetermined discharge condition is not detected, the methodology returns to block 110 and continues. If the predetermined discharge condition is met, such as if motion is detected, the methodology advances to block 145. In block 145, the selected energy storage device 38 is discharged to supply power to the load to illuminate the light source 44 to a predetermined level. It should be appreciated that the discharge of energy is controlled by the energy discharge control switch 40, and the transfer of energy to a particular load by the load control switch 42.

Preferably, in a first illumination mode two LEDs 44 are illuminated. In a second illumination mode, four LEDs 44 are illuminated. In a third illumination mode, two pairs of LEDs 44 switch on in an alternate manner. The intensity of the LEDs 44 is maintained constant by controlling the current through the LEDs 44. For example, pulse width modulation (PWM) is utilized to maintain a constant current through the LEDs 44. The duty cycle of the PWM is inversely related to the battery voltage currently being used, that is, the higher the voltage, the lower the duty cycle. As the voltage decreases, the duty cycle, that is the on time versus the off time, is increased to maintain a constant current, and therefore a constant light amplitude. Advantageously, with the use of the passive infrared motion sensor, the light level can be reduced or completely turned off when the restroom is unoccupied to conserve energy. The methodology returns to block 110 and continues.

Returning to diamond 125, if it is determined that a predetermined condition is met for charging the energy storage device 38, i.e. it is daytime, the methodology continues to block 150. In block 150, the transfer of energy to the load, or light source 44 of this example is discontinued. The methodology advances to diamond 155.

In diamond 155, the methodology selects at least one of the energy storage devices 38 and determines if a predetermined condition is met for charging the selected energy storage devices 38. An example of a predetermined charge condition is a minimum charge level. It should be appreciated that a flag may be set when an energy storage device is discharged to the predetermined minimum level and checked to determine if the selected energy storage device should be discharged. If the predetermined charging condition is met, other charge conditions may also be evaluated. An example of a predetermined temperature condition is if the battery temperature is less than a predetermined maximum temperature for charging the energy storage device. If the predetermined temperature condition is not met, the methodology advances to block 160. In block 160, the methodology stops charging of the selected energy storage device 38. The methodology returns to block 110 and continues.

Returning to diamond 155, if the predetermined temperature condition is met, the methodology advances to diamond 165 and determines if a second predetermined temperature condition is met for charging the selected energy storage device 38. An example of a second predetermined temperature condition is if the ambient temperature is greater than a predetermined minimum temperature for charging the energy storage device 38. If the second predetermined temperature condition is not met because the ambient temperature is too low for charging the energy storage device 38, the methodology advances to block 170. In block 170, the methodology performs pulse charging to slowly raise the temperature of the energy storage device 38. The methodology returns to block 110.

Returning to diamond 165, if the second predetermined temperature condition is met, such as if the temperature is greater than a predetermined minimum temperature for charging the battery, the methodology advances to block 175. In block 175, the methodology charges the selected energy storage device 38 by operatively closing the corresponding energy charge control switch to transfer energy collected by the solar energy collector 22 to the energy storage device 38.

It should be appreciated that the system preferably includes a state of charge sensor 46 that senses the level of charge of the energy storage device 38, charges the appropriate energy storage device 38, and discontinues charging the energy storage device 38 if a predetermined condition is met, such as the battery voltage has a negative slope for a given period of time. Preferably, the energy transfer bus 36b is isolated from the energy storage device 38 using the energy charge control switch 34 or energy discharge control switch 40, when determining the charge level, to avoid the influence of external factors. The methodology returns to block 110 and continues.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A solar powered device having an integral power management system comprising:

a means for collecting solar energy;

a means for storing the collected solar energy operatively connected to said solar energy collecting means via an energy transfer bus, wherein said energy storage means includes a plurality of energy storage devices;

a control means for selecting to charge at least one energy storage device and selecting to discharge at least one energy storage device, wherein said selected at least one discharging energy storage device is discharged to a predetermined level before selecting to recharge said selected at least one discharging energy storage device;

a sensing means for sensing a predetermined condition for charging at least one energy storage device, wherein said sensing means is in electrical communication with said control means;

an energy charge switching means responsive to a signal from said control means for selectively charging at least one of said energy storage devices to the predetermined charge level by transferring energy from said solar energy collecting means to said selected at least one charging energy storage device upon the occurrence of the predetermined charging condition;

a sensing means for sensing a predetermined condition for discharging said selected at least one energy storage device, wherein said sensing means is in electrical communication with said control means;

an energy discharge switching means responsive to a signal from said control means for selectively discharging energy from said selected at least one discharging energy storage device to the predetermined discharge level upon the occurrence of the predetermined discharging condition; and a load switching means responsive to a signal from said control means for delivering energy from said selected at least one discharging energy storage device to the load for operatively powering the solar powered device.

2. A solar powered device as set forth in claim 1 wherein said means for collecting solar energy is a solar panel.

3. A solar powered device as set forth in claim 1 wherein said energy storage device is a rechargeable battery.

4. A solar powered device as set forth in claim 1 wherein said energy storage device is a storage capacitor.

5. A solar powered device as set forth in claim 1 wherein said sensing means for sensing the predetermined charging condition is a charge sensor for sensing the charge level of said energy storage device.

6. A solar powered device as set forth in claim 1 wherein said sensing means for sensing the predetermined charging condition is a temperature sensor for sensing a temperature of said energy storage unit.

7. A solar powered device as set forth in claim 6 wherein said predetermined charging condition is if the temperature of the energy storage device is within a predetermined temperature range.

8. A solar powered device as set forth in claim 1 wherein said solar powered device is a light.

9. A solar powered device as set forth in claim 8, wherein said sensing means for sensing the predetermined discharging condition is a passive infrared sensor for sensing when to illuminate said light.

10. A solar powered device as set forth in claim 1, wherein said solar powered device is a solar powered light further comprising:

a housing having a generally planar support member, wherein said solar energy collecting means is a solar energy collector disposed on an upper surface of said support member;

a projecting member extending radially from said support member, wherein said projecting member houses a power distribution system including said energy storage means, said control means, said energy charge sensing means, said energy charge switching means, said energy discharge sensing means, said energy discharge switching means, said load switching means and at least one light source operatively connected to said load switching means, such that said selected at least one discharging energy storage device provides power to illuminate said light.

11. A solar powered device as set forth in claim 10 wherein said projecting member is tubular in shape.

12. A solar powered device as set forth in claim 11 wherein an outer surface of said projecting member is threaded.

13. A solar powered device as set forth in claim 12 further comprising a retaining member threaded about said threaded surface of said projecting member for fixedly mounting said housing within a structure.

14. A solar powered device as set forth in claim 10 further comprising a removable end cap disposed in a distal end of said projecting member, wherein said end cap includes an aperture and a light emitting diode is disposed within the aperture.

15. A solar powered device as set forth in claim 10, wherein said discharge sensing means for sensing a predetermined discharging condition is a light level sensor.

16. A solar powered device as set forth in claim 1 further comprising a peak energy control switch electrically in communication with said control means for selectively providing energy to said control means from at least one discharging energy control device with peak energy.

17. A solar powered light assembly having an integral power management system comprising:
   a housing;
   a light source disposed within the housing;
   a solar energy collector disposed on an outer surface of said housing; and
   a power distribution system disposed within said housing and operatively connected to said solar energy collector and said light source, wherein said power distribution system includes a means for storing the collected solar energy having a plurality of energy storage devices, a control means for selecting to charge at least one energy storage device and selecting to discharge at least one energy storage device, a charge sensing means in electrical communication with said control means, a discharge sensing means in electrical communication with said control means, an energy charge switching means responsive to a signal from the control means for selectively charging at least one of said energy storage devices to a predetermined charge level by transferring energy from said solar energy collector to said selected at least one charging energy storage device, an energy discharge switching means responsive to a signal from said control means for selectively discharging energy from said selected at least one discharging energy storage device to a predetermined discharge level, and a load switching means responsive to a signal from the control means for delivering energy from said selected at least one discharging energy storage device to said light source.

18. A solar powered light assembly as set forth in claim 17 wherein said housing includes a generally planar support member, and a projecting member extending radially from said support member.

19. A solar powered light assembly as set forth in claim 18 wherein said projecting member is tubular in shape.

20. A solar powered light assembly as set forth in claim 19 wherein an outer surface of said projecting member is threaded.

21. A solar powered light assembly as set forth in claim 20 further comprising a retaining member threaded about said threaded surface of said projecting member for fixedly mounting said housing to a structure.

22. A solar powered light assembly as set forth in claim 17 further comprising a removable end cap disposed in a distal end of said projecting, wherein said end cap includes an aperture and a light emitting diode is disposed within the aperture.

23. A solar powered light assembly as set forth in claim 17 wherein said discharge sensing means is a light level sensor for sensing a level of light.

24. A solar powered light assembly as set forth in claim 17 wherein said solar energy collector is a solar panel.

25. A solar powered light assembly as set forth in claim 17 wherein said energy storage device is a rechargeable battery.

26. A solar powered light assembly as set forth in claim 17 wherein said energy storage device is a storage capacitor.

27. A solar powered light assembly as set forth in claim 17 wherein said light source is a light emitting diode (LED) and the LEDS are illuminated in a predetermined sequence to provide a constant LED light amplitude.

28. A solar powered light assembly as set forth in claim 17 wherein said charge sensing means is a sensor for sensing a voltage output of the energy storage device.

29. A solar powered light assembly as set forth in claim 17 wherein said charge sensing means is a temperature sensor for sensing a temperature within said energy storage unit.

30. A solar powered light assembly as set forth in claim 17 further comprising a peak energy control switch electrically in communication with said control means for selectively providing energy to said control means from at least one discharging energy control device with peak energy.

31. A solar powered light assembly as set forth in claim 17 wherein said discharge sensing means is a passive infrared sensor for sensing when to illuminate said light.

32. A solar powered light assembly as set forth in claim 17 further comprising an energy transfer bus interconnecting said solar energy collector panel, energy storage device and light for transferring energy therebetween.

33. A method of power management for a solar powered device, said method comprising the steps of:
   determining a predetermined condition is met for supplying energy to a load for operatively powering the solar powered device;
   selecting at least one energy storage device for discharging and selectively discharging energy from said selected at least one energy storage device to the load, if the selected at least one energy storage device contains a predetermined level of stored energy for supplying energy to the solar powered device and checking the predetermined level of stored energy of another selected energy storage device, if the selected at least one energy storage device does not contain a predetermined level of stored energy, until selecting at least one energy storage device having a predetermined level of stored energy;
   determining if a predetermined condition is met for charging at least one energy storage device by transferring energy from said solar energy collector to said selected at least one charging energy storage device;
   selectively charging at least one charging energy storage device by transferring energy collected by the solar collector to the selected at least one charging energy storage device if the predetermined charging condition is met; and
   discharging the selected at least one discharging energy storage device to a predetermined discharge level before selecting to charge the selected at least one discharging energy storage device to a predetermined charge level.

34. A method as set forth in claim 33 wherein said step of selecting at least one energy storage device for discharging includes the step of determining if a charge level of the selected energy storage device meets a predetermined charge level criteria.

35. A method as set forth in claim 34, wherein said selected energy storage device is electrically isolated when determining the charge level of the selected energy storage device.

36. A method as set forth in claim 33 wherein said solar powered device is a solar powered light.

37. A method as set forth in claim 36 wherein said step of determining if a predetermined condition is met includes the step of determining a time of day and illuminating the light source using energy from the selected at least one discharging energy storage device if it is nighttime and charging the selected at least one charging energy storage device if it is daytime.

38. A method as set forth in claim 36 wherein said step of determining if a predetermined condition is met includes the step of determining if motion is detected by a motion sensor and sending a signal to the control means to illuminate the light if motion is detected.

39. A method as set forth in claim 33 wherein said step of selectively charging at least one energy storage device includes the step of determining if a temperature of the selected at least one charging energy storage device exceeds a predetermined temperature and discontinuing charging if the predetermined temperature is exceeded.

40. A method as set forth in claim 33 wherein said step of selectively charging at least one energy storage device includes the step of determining if an ambient temperature is less than a predetermined temperature level for charging the selected at least one charging energy storage device, and pulse charging the selected at least one charging energy storage device if the ambient temperature is less than a predetermined level.

41. A method of power management for a solar powered device, said method comprising the steps of:
    determining that a predetermined condition is met for supplying energy to a load for operatively powering the solar powered device;
    selecting at least one energy storage device for discharging and selectively discharging energy from said selected at least one energy storage device to the load, if the selected at least one energy storage device contains a predetermined level of stored energy for supplying energy to the solar powered device and checking the predetermined level of stored energy of another selected energy storage device, if the selected at least one energy storage device does not contain a predetermined level of stored energy, until selecting at least one energy storage device having a predetermined level of stored energy;
    determining if a predetermined condition is met for charging at least one energy storage device by transferring energy from said solar energy collector to said selected at least one charging energy storage device;
    selectively charging at least one charging energy storage device by transferring energy collected by the solar collector to the selected at least one charging energy storage device if the predetermined charging condition is met;
    discharging the selected at least one discharging energy storage device to a predetermined discharge level to operatively power the solar powered device, before selecting to charge the selected at least one discharging energy storage device to a predetermined charge level; and
    using energy from the selected at least one discharging energy storage device to power a control means, monitoring the charge level of the selected at least one discharging energy control means, and selecting another at least one energy storage device to power the control means if the charge level of the selected discharging energy control means falls below a predetermined peak voltage level.

42. A solar powered device having an integral power management system comprising:
    a means for collecting solar energy;
    a means for storing the collected solar energy operatively connected to said solar energy collecting means via an energy transfer bus, wherein said energy storage means includes a plurality of energy storage devices;
    a control means for selecting to charge at least one energy storage device and selecting to discharge at least one energy storage device, wherein said selected at least one discharging energy storage device is discharged to a predetermined level before selecting to recharge said selected at least one discharging energy storage device;
    a sensing means for sensing a predetermined condition for charging at least one energy storage device, wherein said sensing means is in electrical communication with said control means;
    an energy charge switching means responsive to a signal from said control means for selectively charging at least one of said energy storage devices to the predetermined charge level by transferring energy from said solar energy collecting means to said selected at least one charging energy storage device upon the occurrence of the predetermined charging condition;
    a sensing means in electrical communication with said control means for sensing a predetermined condition for discharging said selected at least one energy storage device, wherein said predetermined discharging condition is if the selected energy storage device has a predetermined level of energy stored therein;
    an energy discharge switching means responsive to a signal from said control means for selectively discharging energy from said selected at least one discharging energy storage device to the predetermined discharge level upon the occurrence of the predetermined discharging condition; and
    a load switching means responsive to a signal from said control means for delivering energy from said selected at least one discharging energy storage device to the load for operatively powering the solar powered device.

43. A solar powered device as set forth in claim 42 wherein said means for collecting solar energy is a solar panel.

44. A solar powered device as set forth in claim 42 wherein said energy storage device is a rechargeable battery.

45. A solar powered device as set forth in claim 42 wherein said energy storage device is a storage capacitor.

46. A solar powered device as set forth in claim 42 wherein said sensing means for sensing the predetermined charging condition is a charge sensor for sensing the charge level of said energy storage device.

47. A solar powered device as set forth in claim 42 wherein said sensing means for sensing the predetermined charging condition is a temperature sensor for sensing a temperature of said energy storage unit.

48. A solar powered device as set forth in claim 47 wherein said predetermined charging condition is if the temperature of the energy storage device is within a predetermined temperature range.

49. A solar powered device as set forth in claim 42 wherein said solar powered device is a light.

50. A solar powered device as set forth in claim 42, wherein said solar powered device is a solar powered light further comprising:
   a housing having a generally planar support member, wherein said solar energy collecting means is a solar energy collector disposed on an upper surface of said support member;
   a projecting member extending radially from said support member, wherein said projecting member houses a power distribution system including said energy storage means, said control means, said energy charge sensing means, said energy charge switching means, said energy discharge sensing means, said energy discharge switching means, said load switching means and at least one light source operatively connected to said load switching means, such that said selected at least one discharging energy storage device provides power to illuminate said light.

51. A solar powered device as set forth in claim 50 wherein said projecting member is tubular in shape.

52. A solar powered device as set forth in claim 51 wherein an outer surface of said projecting member is threaded.

53. A solar powered device as set forth in claim 52 further comprising a retaining member threaded about said threaded surface of said projecting member for fixedly mounting said housing within a structure.

54. A solar powered device as set forth in claim 50 further comprising a removable end cap disposed in a distal end of said projecting member, wherein said end cap includes an aperture and a light emitting diode is disposed within the aperture.

55. A solar powered device as set forth in claim 50, wherein said discharge sensing means for sensing a predetermined discharging condition is a light level sensor.

56. A solar powered device as set forth in claim 42 further comprising a peak energy control switch electrically in communication with said control means for selectively providing energy to said control means from at least one discharging energy control device with peak energy.

57. A method of power management for a solar powered device, said method comprising the steps of:
   determining that a predetermined condition is met for supplying energy to a load for operatively powering the solar powered device by checking an input parameter from a sensor to the control means;
   selecting at least one energy storage device for discharging and selectively discharging energy from said selected at least one energy storage device to the load, if the selected at least one energy storage device contains a predetermined level of stored energy for supplying energy to the solar powered device and checking the predetermined level of stored energy of another selected energy storage device, if the selected at least one energy storage device does not contain a predetermined level of stored energy, until selecting at least one energy storage device having a predetermined level of stored energy;
   determining if a predetermined condition is met for charging at least one energy storage device by transferring energy from said solar energy collector to said selected at least one charging energy storage device;
   selectively charging at least one charging energy storage device by transferring energy collected by the solar collector to the selected at least one charging energy storage device if the predetermined charging condition is met; and
   discharging the selected at least one discharging energy storage device to a predetermined discharge level before selecting to charge the selected at least one discharging energy storage device to a predetermined charge level.

58. A method as set forth in claim 57 wherein said step of selecting at least one energy storage device for discharging includes the step of determining if a charge level of the selected energy storage device meets a predetermined charge level criteria.

59. A method as set forth in claim 58, wherein said selected energy storage device is electrically isolated when determining the charge level of the selected energy storage device.

60. A method as set forth in claim 57 wherein said solar powered device is a solar powered light.

61. A method as set forth in claim 60 wherein said step of determining if a predetermined condition is met includes the step of determining a time of day and illuminating the light source using energy from the selected at least one discharging energy storage device if it is nighttime and charging the selected at least one charging energy storage device if it is daytime.

62. A method as set forth in claim 60 wherein said step of determining if a predetermined condition is met includes the step of determining if motion is detected by a motion sensor and sending a signal to the control means to illuminate the light if motion is detected.

63. A method as set forth in claim 57 wherein said step of selectively charging at least one energy storage device includes the step of determining if a temperature of the selected at least one charging energy storage device exceeds a predetermined temperature and discontinuing charging if the predetermined temperature is exceeded.

64. A method as set forth in claim 57 wherein said step of selectively charging at least one energy storage device includes the step of determining if an ambient temperature is less than a predetermined temperature level for charging the selected at least one charging energy storage device, and pulse charging the selected at least one charging energy storage device if the ambient temperature is less than a predetermined level.

* * * * *